US012770985B2

(12) United States Patent
Lin et al.

(10) Patent No.: US 12,770,985 B2
(45) Date of Patent: Oct. 20, 2026

(54) BATTERY CELL, BATTERY, POWER CONSUMING DEVICE, AND METHOD AND APPARATUS FOR MANUFACTURING BATTERY CELL

(71) Applicant: CONTEMPORARY AMPEREX TECHNOLOGY (HONG KONG) LIMITED, Hong Kong (CN)

(72) Inventors: Denghua Lin, Ningde (CN); Zhijun Guo, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 747 days.

(21) Appl. No.: 18/098,130

(22) Filed: Jan. 18, 2023

(65) Prior Publication Data

US 2023/0178860 A1 Jun. 8, 2023

Related U.S. Application Data

(63) Continuation of application No. PCT/CN2021/109916, filed on Jul. 30, 2021.

(51) Int. Cl.
*H01M 50/533* (2021.01)
*H01M 4/70* (2006.01)
(Continued)

(52) U.S. Cl.
CPC ........... *H01M 50/533* (2021.01); *H01M 4/70* (2013.01); *H01M 50/103* (2021.01); *H01M 50/176* (2021.01); *H01M 50/536* (2021.01)

(58) Field of Classification Search
CPC .. H01M 50/533; H01M 50/15; H01M 50/209; H01M 50/528; H01M 50/538;
(Continued)

(56) References Cited

U.S. PATENT DOCUMENTS

2010/0247989 A1 9/2010 Kim
2011/0200849 A1 8/2011 Byun et al.
(Continued)

FOREIGN PATENT DOCUMENTS

CN 102163708 A 8/2011
CN 106688123 A 5/2017
(Continued)

OTHER PUBLICATIONS

International Search Report and Written Opinion mailed on Apr. 1, 2022, in corresponding PCT/CN2021/109916, 13 pages.
(Continued)

*Primary Examiner* — Adam A Arciero
(74) *Attorney, Agent, or Firm* — XSENSUS LLP

(57) ABSTRACT

A battery cell may include a housing; an end cap assembly comprising a cover plate and an electrode terminal; an electrode assembly comprising a main body and a tab extending from an end of the main body in a first direction, the first direction being perpendicular to a second direction; and a current collecting structure comprising a terminal connecting portion and a tab connecting portion that may be separately provided and connected to each other, and the tab connecting portion being configured such that: the tab connecting portion has a rigidity less than the rigidity of the terminal connecting portion to allow a relative movement between the cover plate and the electrode assembly by means of deformation of the tab connecting portion.

18 Claims, 7 Drawing Sheets

(51) Int. Cl.
*H01M 50/103* (2021.01)
*H01M 50/176* (2021.01)
*H01M 50/536* (2021.01)

(58) Field of Classification Search
CPC .. H01M 50/55; H01M 50/566; H01M 50/531; H01M 50/534; H01M 50/553; H01M 50/562; H01M 50/567; H01M 50/103; H01M 50/176; H01M 50/536; H01M 2220/20; H01M 10/04; H01M 10/0431; Y02P 70/50; Y02E 60/10
See application file for complete search history.

(56) References Cited

U.S. PATENT DOCUMENTS

| | | | | |
|---|---|---|---|---|
| 2012/0070705 | A1* | 3/2012 | Kim | H01M 10/0413 429/61 |
| 2017/0294684 | A1 | 10/2017 | Sato et al. | |
| 2022/0115748 | A1* | 4/2022 | Xu | H01M 50/533 |

FOREIGN PATENT DOCUMENTS

| | | | |
|---|---|---|---|
| CN | 207818736 | U | 9/2018 |
| CN | 111048728 | A | 4/2020 |
| CN | 211828849 | U | 10/2020 |
| CN | 112117424 | A | 12/2020 |
| CN | 112701422 | A | 4/2021 |
| CN | 112909392 | A | 6/2021 |
| CN | 215266587 | U | 12/2021 |
| WO | 2019/148662 | A1 | 8/2019 |

OTHER PUBLICATIONS

Extended European Search Report issued Jan. 31, 2024 in European Patent Application No. 21949528.0.

Notice of Grant of Invention Patent Right issued Aug. 4, 2025 in Chinese Patent Application No. 202180057771.2 with English translation thereof.

* cited by examiner

BATTERY CELL, BATTERY, POWER CONSUMING DEVICE, AND METHOD AND APPARATUS FOR MANUFACTURING BATTERY CELL

CROSS REFERENCE TO RELATED APPLICATION

The present application is a continuation of International Application No. PCT/CN2021/109916, filed Jul. 30, 2021, the entire content of which is incorporated herein by reference in its entirety.

TECHNICAL FIELD

The present application relates to the technical field of battery manufacturing, and in particular to a battery cell, a battery, a power consuming device, and a method and apparatus for manufacturing the battery cell.

BACKGROUND ART

Achieving energy conservation and emission reduction is the key to the sustainable development of the automotive industry. Electric vehicles have become an important part of the sustainable development of the automotive industry due to their advantages in energy conservation and environmental protection. In addition, for the electric vehicles, the technical development level of lithium batteries plays a key role.

With the rapid development of lithium battery industry, high requirements are also put forward for the assembly precision of a battery cell. There is an assembly error during assembly of the battery cell, resulting in the reduction of energy density and safety performance of the battery cell.

SUMMARY OF THE DISCLOSURE

The present application provides a battery cell, a battery, a power consuming device, and a method and apparatus for manufacturing the battery cell, which provide high energy density and safety performance.

An embodiment in a first aspect of the present application provides a battery cell, comprising: a housing provided with an opening; an end cap assembly comprising a cover plate and an electrode terminal, the cover plate being used to cover the opening, and the electrode terminal being provided on the cover plate; an electrode assembly provided in the housing, the electrode assembly comprising a main body and a tab extending from an end of the main body in a first direction, the end cap assembly being located on one side of the main body in a second direction, and the first direction being perpendicular to the second direction; and a current collecting member comprising a terminal connecting portion and a tab connecting portion that are separately provided and connected to each other, at least part of the tab connecting portion being provided between the main body and the housing in the first direction, at least part of the terminal connecting portion being provided between the main body and the cover plate in the second direction, the tab connecting portion being used to connect the tab and the terminal connecting portion, and the tab connecting portion being configured such that: the tab connecting portion has a rigidity less than the rigidity of the terminal connecting portion to allow a relative movement between the cover plate and the electrode assembly by means of deformation of the tab connecting portion.

In the battery cell described above, the current collecting member comprises the terminal connecting portion and the tab connecting portion that are separately provided and connected to each other, the tab connecting portion has a rigidity less than the rigidity of the terminal connecting portion, and when the electrode assembly is placed into the housing, the tab connecting portion can be deformed to allow the relative movement between the cover plate and the electrode assembly, so as to close the opening of the housing by means of the cover plate, so that the adverse effect caused by an assembly error can be reduced during assembly, the assembly accuracy precision between the cover plate and the housing can be improved, and the battery cell thus has high energy density, safety performance and appearance quality.

According to some embodiments of the present application, the tab connecting portion extends in the second direction and is provided between the main body and the housing in the first direction, and the terminal connecting portion comprises a first portion that is provided between the cover plate and the main body and used for connection to the electrode terminal, and a second portion that extends in the second direction and is provided between the main body and the housing and used for connection to the tab connecting portion.

Both the second portion and the tab connecting portion extend in the second direction and are provided between the main body and the housing, the second portion is connected to the tab connecting portion, and part of the second portion is deformable to allow the relative movement between the cover plate and the electrode assembly.

According to some embodiments of the present application, the second portion is overlapped with and connected to the tab connecting portion in a third direction, the third direction is perpendicular to the first direction and the second direction, and a thickness direction of the tab and a thickness direction of the tab connecting portion are both parallel to the third direction.

The thicknesses of the second portion, of the tab connecting portion, and of the tab all extend in the third direction, which can make full use of the space around the tab to accommodate the current collecting member, so that the current collecting member can be compactly assembled with the electrode assembly, and the energy density of the battery cell can be improved. There is an overlapping area between the second portion and the tab connecting portion in the third direction, so that there are large connection areas between the tab connecting portion and the tab, and between the tab connecting portion and the second portion, and the overcurrent capacity of the current collecting member is thus improved.

According to some embodiments of the present application, the second portion is located on the side of the tab connecting portion away from the tab.

The second portion and the tab are connected to the tab connecting portion on two sides of the tab connecting portion, respectively, so that it is possible not only to prevent short circuit inside the battery cell due to an end of the second portion being inserted into the tab, but also to make full use of surfaces on the two sides of the tab connecting portion, thereby increasing the connection areas between the tab and the tab connecting portion, and between the second portion and the tab connecting portion, and improving the overcurrent capacity of the current collecting member.

According to some embodiments of the present application, the tab comprises two tab edge portions and a tab main body provided between the two tab edge portions, the two tab edge portions protruding from the tab main body in the third direction, the two tab edge portions and the tab main body jointly defining an accommodating space, and the tab connecting portion being at least partially located in the accommodating space and connected to the tab main body.

At least part of the tab connecting portion is connected to the tab main body inside the accommodating space of the tab, so that the accommodating space of the tab can be effectively used without increasing the maximum external dimension of the electrode assembly assembled with the current collecting member, and thus the battery cell is compact in structure and has a high energy density.

According to some embodiments of the present application, the tab connecting portion comprises a first segment, a second segment and a third segment that are provided in the second direction, the first segment being used for connection to the terminal connecting portion, the third segment being used for connection to the tab, the second segment being connected to the first segment and the third segment, and the tab connecting portion allowing the relative movement between the cover plate and the electrode assembly by means of deformation of the second segment.

The tab connecting portion is connected to the terminal connecting portion by means of the first segment, the third segment is connected to the tab, and the second segment is deformable to allow the relative movement between the cover plate and the electrode assembly, thereby closing the opening of the housing by means of the cover plate.

According to some embodiments of the present application, the tab connecting portion has a thickness less than the thickness of the terminal connecting portion so as to achieve that the tab connecting portion has a rigidity less than the rigidity of the terminal connecting portion.

According to some embodiments of the present application, the tab connecting portion has a hardness less than the hardness of the terminal connecting portion so as to achieve that the tab connecting portion has a rigidity less than the rigidity of the terminal connecting portion.

According to some embodiments of the present application, the tab connecting portion is of a multilayer structure and comprises a plurality of layers of conductive sheets provided in a stacked manner, and the terminal connecting portion is of a single-layer structure so as to achieve that the tab connecting portion has a rigidity less than the rigidity of the terminal connecting portion.

According to some embodiments of the present application, each layer of conductive sheet of the plurality of layers of conductive sheets has the same thickness.

Each layer of conductive sheet of the plurality of layers of conductive sheets has the same thickness, so that current uniformly flows through the tab connecting portion, and each layer of conductive sheet has the same rigidity, so that the single layer of conductive sheet is less likely to break when the tab connecting portion is deformed.

According to some embodiments of the present application, two adjacent layers of conductive sheets of the plurality of layers of conductive sheets are connected to each other by welding or by means of a conductive adhesive.

In the above-described structural form, it is possible to connect two adjacent layers of conductive sheets to improve the overcurrent capacity of the tab connecting portion.

An embodiment in a second aspect of the present application provides a battery, comprising a battery cell of the embodiment in the first aspect of the present application.

An embodiment in a third aspect of the present application provides a power consuming device, comprising a battery of the embodiment in the second aspect of the present application.

An embodiment in a fourth aspect of the present application provides a method for manufacturing a battery cell, comprising:

providing a housing, the housing being provided with an opening;

providing an end cap assembly, the end cap assembly comprising a cover plate and an electrode terminal, the cover plate being used to cover the opening, and the electrode terminal being provided on the cover plate;

providing an electrode assembly, the electrode assembly comprising a main body and a tab extending from an end of the main body in a first direction, the end cap assembly being located on one side of the main body in a second direction, and the first direction being perpendicular to the second direction;

providing a current collecting member, the current collecting member comprising a terminal connecting portion and a tab connecting portion that are separately provided and connected to each other, at least part of the tab connecting portion being provided between the main body and the housing in the first direction, at least part of the terminal connecting portion being provided between the main body and the cover plate in the second direction, the tab connecting portion being used to connect the tab and the terminal connecting portion, and the tab connecting portion being configured such that: the tab connecting portion has a rigidity less than the rigidity of the terminal connecting portion to allow a relative movement between the cover plate and the electrode assembly by means of deformation of the tab connecting portion; and connecting the tab and the electrode terminal by means of the current collecting member, placing the electrode assembly inside the housing, and then closing the opening with the cover plate.

An embodiment in a fifth aspect of the present application provides an apparatus for manufacturing a battery cell, comprising:

a first provision device for providing a housing, the housing being provided with an opening;

a second provision device for providing an end cap assembly, the end cap assembly comprising a cover plate and an electrode terminal, the cover plate being used to cover the opening, and the electrode terminal being provided on the cover plate;

a third provision device for providing an electrode assembly, the electrode assembly comprising a main body and a tab extending from an end of the main body in a first direction, the end cap assembly being located on one side of the main body in a second direction, and the first direction being perpendicular to the second direction;

a fourth provision device for providing a current collecting member, the current collecting member comprising a terminal connecting portion and a tab connecting portion that are separately provided and connected to each other, at least part of the tab connecting portion being provided between the main body and the housing in the first direction, at least part of the terminal connecting portion being provided between the main body and the cover plate in the second direction, the tab connecting portion being used to connect the tab and the terminal connecting portion, and the tab connecting portion being configured such that: the tab connecting portion has a rigidity less than the rigidity of the terminal connecting portion to allow a relative movement between the cover plate and the electrode assembly by means of deformation of the tab connecting portion; and a mounting module for connecting the tab and the electrode terminal by means of the current collecting member, placing the electrode assembly inside the housing, and then closing the opening with the cover plate.

Additional aspects and advantages of the present application will be set forth in part in the following description, and in part will be apparent from the following description, or may be learned by practice of the present application.

BRIEF DESCRIPTION OF THE DRAWINGS

In order to more clearly describe the technical solutions of the embodiments of the present application, the drawings being used in the embodiments will be described briefly below. It should be understood that the following drawings illustrate only some embodiments of the present application and should therefore not be construed as a limitation on the scope thereof. For those of ordinary skill in the art, other relevant drawings can also be obtained from these drawings without any creative effort.

Figure 1:
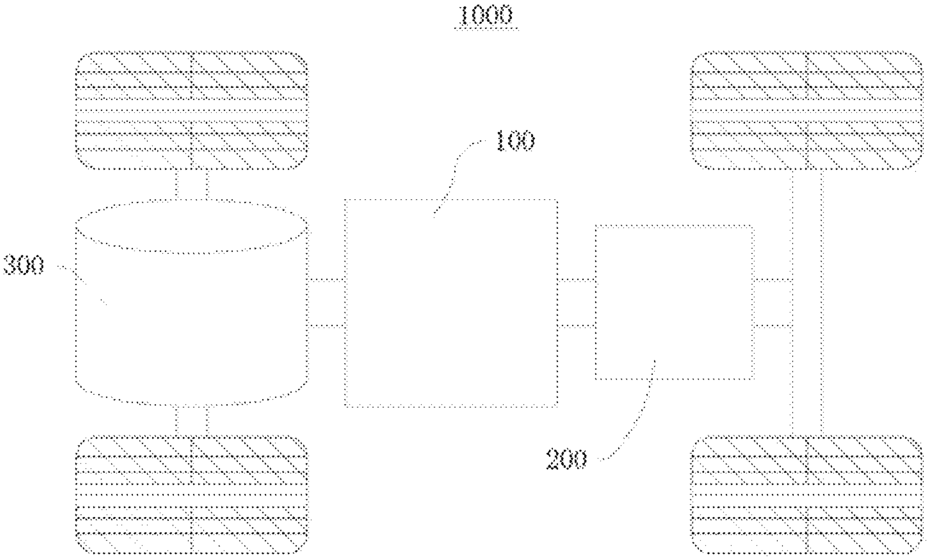
FIG. 1 shows a simple schematic diagram of a vehicle in some embodiments of the present application.

In the drawings, the figures are not drawn to the actual scale.

List of reference signs: 1000—vehicle; 100—battery; 10—battery cell; 11—housing; 111—opening edge; 12—end cap assembly; 121—cover plate; 1211—cover plate edge; 122—electrode terminal; 123—pressure relief portion; 13—electrode assembly; 131—main body; 132—tab; 1321—tab main body; 1322—tab edge portion; 1323—accommodating space; 14—current collecting member; 141—terminal connecting portion; 1411—first portion; 1412—second portion; 1413—terminal via hole; 1414—positioning hole; 142—tab connecting portion; 1421—first segment; 1422—second segment; 1423—third segment; 1424—first surface; 1425—second surface; 1426—conductive sheet; 15—insulating member; 20—case; 21—first case; 22—second case; 200—controller; and 300—motor.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without creative efforts shall fall within the scope of protection of the present application.

Unless otherwise defined, all technical and scientific terms used in the present application have the same meanings as those commonly understood by those skilled in the art to which the present application belongs. The terms used in the description of the present application are merely for the purpose of describing specific embodiments, but are not intended to limit the present application. The terms "comprise" and "have" and any variations thereof in the description and the claims of the present application as well as the foregoing description of the drawings are intended to cover non-exclusive inclusions. The terms "first", "second", etc. in the description and the claims of the present application as well as the foregoing drawings are used to distinguish between different objects, rather than describing a specific order or a primary-secondary relationship.

In the present application, the "embodiments" mentioned means that the specific features, structures and characteristics described with reference to the embodiments may be included in at least one embodiment of the present application. The phrase at various locations in the description does not necessarily refer to the same embodiment, or an independent or alternative embodiment exclusive of another embodiment. Those skilled in the art should understand, in explicit and implicit manners, that an embodiment described in the present application may be combined with another embodiment.

In the description of the present application, it should be noted that, the terms "mount", "connected", "connect", or "attach" should be interpreted in a broad sense unless explicitly defined and limited otherwise. For example, the terms may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

"A plurality of" appearing in the present application means two or more (including two).

In the present application, a battery cell may include a lithium ion secondary battery, a lithium ion primary battery, a lithium-sulfur battery, a sodium/lithium ion battery, a sodium ion battery, a magnesium ion battery, etc., which is not limited in the embodiments of the present application. The battery cell may be cylindrical, flat, cuboid or in another shape, which is also not limited in the embodiments of the present application. The battery cells are generally classified into three types according to a packaging approach: cylindrical battery cells, prismatic battery cells and pouch battery cells.

A battery mentioned in some embodiments of the present application refers to a single physical module comprising one or more battery cells to provide a higher voltage and capacity. For example, the battery mentioned in the present application may comprise a battery module, a battery pack, etc. The battery generally comprises a case for packaging one or more battery cells. The case can prevent liquid or other foreign objects from affecting charge or discharge of the battery cells.

The battery cell comprises an electrode assembly and an electrolyte solution, wherein the electrode assembly is composed of a positive electrode plate, a negative electrode plate and a separator. The battery cell operates mainly by relying on movement of metal ions between the positive electrode plate and the negative electrode plate. The positive electrode plate comprises a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. A lithium ion battery is taken as an example, the positive electrode current collector may be made of aluminum, and a positive electrode active material may be lithium cobalt oxide, lithium iron phosphate, ternary lithium, lithium manganate, etc. The negative electrode plate comprises a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and a negative electrode active material may be carbon, silicon, etc. In order to ensure that no fusing occurs when a large current passes, a plurality of positive tabs are provided and are stacked together, and a plurality of negative tabs are provided and are stacked together. The separator may be made of PP (polypropylene), PE (polyethylene), etc. In addition, the electrode assembly may be of a wound structure or a laminated structure, which is not limited in the embodiments of the present application.

The battery cell further comprises a pressure relief portion that is actuated when an internal pressure of the battery cell reaches a threshold. The threshold varies according to design demands. The threshold may depend on the material of one or more of the positive electrode plate, the negative electrode plate, the electrolyte solution and the separator of the battery cell. The pressure relief portion may be in the form of, for example, an explosion-proof valve, an air valve, a pressure relief valve, a safety valve, etc., and may specifically use a pressure- or temperature-sensitive element or structure, namely, when the internal pressure or temperature of the battery cell reaches the threshold, the pressure relief portion performs an action or a weak structure provided in the pressure relief portion is broken, thereby forming an opening or passage through which the internal pressure or temperature can be released.

The term "actuated" mentioned in the present application means that the pressure relief portion performs an action or is activated to be in a certain state such that the internal pressure and temperature of the battery cell can be released. The action performed by the pressure relief portion may include, but is not limited to: at least part of the pressure relief portion cracks, breaks, is torn or opened, etc. When the pressure relief portion is actuated, a high-temperature and high-pressure material inside the battery cell are outwardly discharged as an emission from the opened part. In this way, with the controllable pressure or temperature, the pressure and the temperature of the battery cell can be released, thereby avoiding potentially more serious accidents.

The battery cell further comprises a current collecting member, wherein the current collecting member is used to electrically connect a tab and an electrode terminal of the battery cell so as to transmit electric energy from the electrode assembly to the electrode terminal and to the outside of the battery cell via the electrode terminal; and a plurality of battery cells are electrically connected by means of a busbar component so as to implement series connection or parallel connection or series-parallel connection of the plurality of battery cells.

The inventor found that an assembly error of the battery cell is mainly reflected in an assembly error between a cover plate and a housing, and in addition, there are various kinds of factors causing the assembly error between the cover plate and the housing, wherein an assembly error of a combination formed by assembling the electrode assembly, the cover plate and the current collecting member is the main factor causing the assembly error between the cover plate and the housing. After the electrode assembly is placed inside the housing, there may be a positional deviation between the cover plate and the electrode assembly, which may cause the cover plate to fail to completely close an opening of the housing. This not only results in poor sealing between the cover plate and the housing, which reduces the safety performance of the battery cell, but also increases an external dimension of the battery cell, which reduces the energy density of the battery cell. If the cover plate and the housing are forcedly assembled, a joint between the current collecting member and the tab will be deformed, and an end of the current collecting member may be inserted into the tab, thus resulting in short circuit inside the battery cell.

On the basis of the above concept, the inventor of the present application proposed a technical solution to improve the current collecting member in the combination formed by assembling the electrode assembly, the cover plate, and the current collecting member, so that part of the structure of the current collecting member can be deformed to allow a relative movement of the cover plate with respect to the electrode assembly, which enables the cover plate and the housing to be well assembled together, and can reduce the assembly error of the battery cell, so that the battery cell has high safety performance, energy density, and appearance quality.

It should be understood that the battery cells described in some embodiments of the present application can directly supply power to a power consuming device, or form a battery in parallel or series connection so as to supply power to various power consuming devices in the form of the battery.

It should be understood that the power consuming device which uses the battery cell or to which the battery is applicable, described in some embodiments of the present application, may be in multiple forms, for example, a mobile phone, a portable apparatus, a laptop, an electric motorcycle, an electric vehicle, a ship, a spacecraft, an electric toy, an electric tool, etc. For example, the spacecraft includes an airplane, a rocket, a space shuttle, a spaceship, etc. The electric toy includes a fixed or mobile electric toy, such as a game console, an electric vehicle toy, an electric ship toy, and an electric airplane toy. The electric tool includes an electric tool for metal cutting, an electric tool for grinding, an electric tool for assembling and an electric tool for railways, such as an electric drill, an electric grinder, an electric wrench, an electric screwdriver, an electric hammer, an electric impact drill, a concrete vibrator, and an electric planer.

The battery cell and the battery described in some embodiments of the present application are not only applicable to the power consuming device described above, but also applicable to all power consuming devices using a battery cell and a battery. However, for the sake of brevity of description, the following embodiments will be described taking an electric vehicle as an example.

FIG. 1 shows a simple schematic diagram of a vehicle in some embodiments of the present application.

As shown in FIG. 1, a battery 100, a controller 200, and a motor 300 are provided inside the vehicle 1000. For example, the battery 100 may be provided at the bottom or at the head or tail of the vehicle 1000. The vehicle 1000 may be a fuel vehicle, a gas vehicle, or a new energy vehicle. The new energy vehicle may be a battery electric vehicle, a hybrid electric vehicle, an extended-range vehicle, etc.

In some embodiments of the present application, the battery 100 may be used to supply power to the vehicle 1000. For example, the battery 100 may serve as a power source for operating the vehicle 1000. The controller 200 is used to control the battery 100 to supply power to the motor 300, for example, for meeting the working power demand during startup, navigation and traveling of the vehicle 1000.

In other embodiments, the battery 100 may not only serve as a power source for operating the vehicle 1000, but may also serve as a power source for driving the vehicle 1000, instead of or partially instead of fuel or natural gas, to provide driving power for the vehicle 1000.

Figure 2:
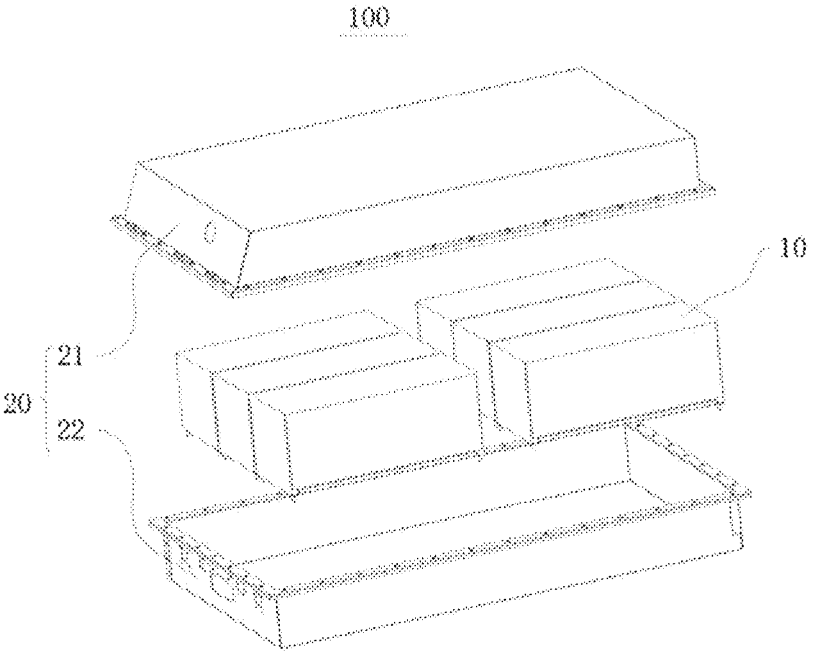
FIG. 2 shows a schematic structural diagram of a battery in the vehicle in FIG. 1.

The battery 100 mentioned in the embodiments of the present application refers to a single physical module comprising one or more battery cells to provide a higher voltage and capacity. FIG. 2 shows a schematic structural diagram of a battery in the vehicle in FIG. 1.

As shown in FIG. 2, the battery 100 comprises a plurality of battery cells 10 and a case 20, wherein the plurality of battery cells 10 are placed in the case 20. The case 20 comprises a first case 21 and a second case 22, wherein the first case 21 and the second case 22 are fitted to each other in a covered manner to form a battery cavity, and the plurality of battery cells 10 are placed in the battery cavity. The first case 21 and the second case 22 may be shaped depending on the shape of a combination of the plurality of battery cells 10, and each of the first case 21 and the second case 22 has an opening. For example, each of the first case 21 and the second case 22 may be a hollow cuboid and has only one side with an opening, the opening of the first case 21 and the opening of the second case 22 are provided opposite each other, and the first case 21 and the second case 22 are snap-fitted to each other to form the case 20 having a closed cavity. The plurality of battery cells 10 are connected to each other in parallel, or in series, or in series and parallel before being placed in the case 20 formed by snap-fitting the first case 21 and the second case 22.

In the battery 100, one or more battery cells 10 may be provided. If a plurality of battery cells 10 are provided, the plurality of battery cells 10 may be connected in series, in parallel, or in series and parallel. A parallel-series connection refers that some of the plurality of battery cells 10 are connected in series and the rest of the plurality of battery cells are connected in parallel. It is possible that a plurality of battery cells 10 are first connected in series, or in parallel, or in series and parallel to form a battery module, and a plurality of battery modules are then connected in series, or in parallel, or in series and parallel to form a unit and are accommodated in the case 20; and it is also possible that all the battery cells 10 are directly connected in series, or in parallel, or in series and parallel, and the unit composed of all the battery cells 10 is then accommodated in the case 20.

In some embodiments, the battery 100 may further comprise a busbar component, and the plurality of battery cells 10 can be electrically connected by means of the busbar component, so as to implement series connection, parallel connection, or series-parallel connection of the plurality of battery cells 10.

The busbar component may be a metal conductor such as a copper conductor, an iron conductor, an aluminum conductor, a stainless steel conductor, and an aluminum alloy conductor.

Figure 3:
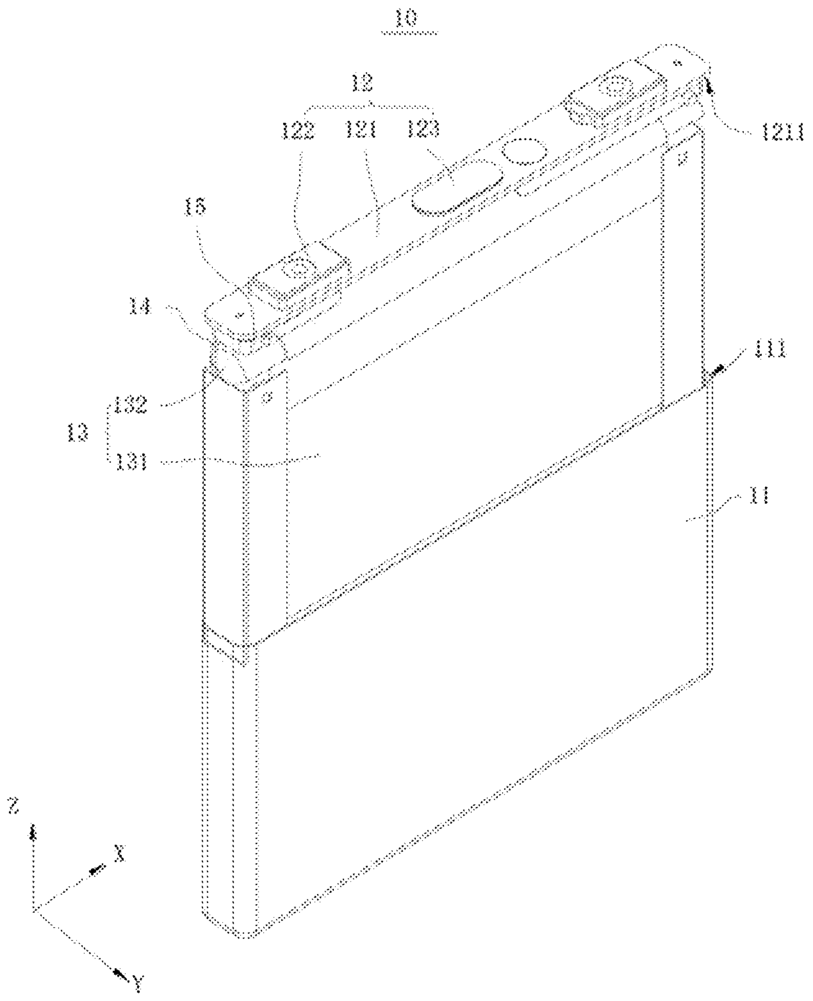
FIG. 3 shows an isometric diagram of one battery cell of the battery in FIG. 2.

FIG. 3 shows an isometric diagram of one battery cell of the battery in FIG. 2.

As shown in FIG. 3, the battery cell 10 comprises a housing 11, an end cap assembly 12, an electrode assembly 13, a current collecting member 14, and an insulating member 15.

The housing 11 may be in a hexahedral shape or other shapes, and an accommodating cavity is formed inside the housing 11 to accommodate the electrode assembly 13 and an electrolyte solution. One end of the housing 11 has an opening so that the electrode assembly 13 can be placed inside the housing 11 through the opening. The housing 11 may be made of a metal material, such as aluminum, aluminum alloy, or nickel plated steel.

As shown in FIG. 3, in some embodiments of the present application, the housing 11 is in the hexahedral shape, with a lengthwise direction extending in a first direction X, a height direction extending in a second direction Z, and a thickness direction extending in a third direction Y, and the side of the housing 11 in the second direction Z is provided with an opening.

In other embodiments, the housing 11 may also be a circular cylinder, or an elliptical cylinder, etc.

In some embodiments of the present application, the first direction X, the second direction Z and the third direction Y are perpendicular to each other.

In other embodiments, the first direction and the second direction Z are perpendicular to each other, and the third direction Y is not limited to having to be perpendicular to both the first direction X and the second direction Z. For example, the third direction Y is perpendicular to the second direction Z, and the third direction Y is provided inclined with respect to the first direction X. For another example, the third direction Y is provided parallel to the first direction X.

Figure 4:
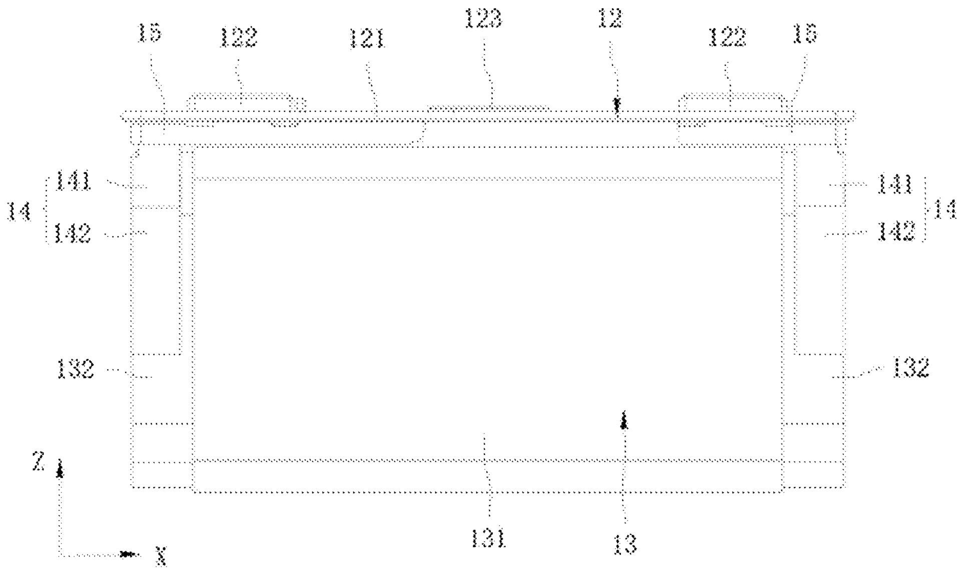
FIG. 4 shows a front schematic structural diagram of a combination formed by assembling an electrode assembly, a cover plate, and a current collecting member of a battery cell in some embodiments of the present application.

FIG. 4 shows a front schematic structural diagram of a combination formed by assembling an electrode assembly, a cover plate, and a current collecting member of a battery cell in some embodiments of the present application.

As shown in FIGS. 3 and 4, the end cap assembly 12 is located on one side of the main body 131 in the second direction Z, and the end cap assembly 12 comprises a cover plate 121, two electrode terminals 122, and a pressure relief portion 123.

The cover plate 121 is used to cover the opening of the housing 11 such that a cover plate edge 1211 circumferentially abuts against an opening edge 111 so as to close the electrode assembly 13 inside the housing 11. The cover plate 121 is made of a metal material, such as aluminum, and steel. The pressure relief portion 123 is configured to be actuated when the internal pressure of the battery cell 10 reaches a threshold, so as to release the internal pressure and temperature of the battery cell 10.

Two electrode lead-out holes are formed in the cover plate 121, and the two electrode terminals 122 are provided in the two electrode lead-out holes of the cover plate 121. One of the two electrode terminals 122 is a positive electrode terminal, and the other is a negative electrode terminal.

In some embodiments of the present application, the cover plate 121 is in the shape of a flat plate, and the cover plate 121 matches the opening of the housing 11 in size and shape. The cover plate edge 1211 of the cover plate 121 circumferentially abuts against the opening edge 111 of the housing 11, so that the cover plate 121 is fixed to the opening of the housing 11, thereby closing the electrode assembly 13 and the electrolyte solution in the accommodating cavity of the housing 11.

As shown in FIGS. 3 and 4, for example, a lengthwise direction of the cover plate 121 extends in the first direction X, a width direction thereof extends in the third direction Y, and a thickness direction thereof extends in the second direction Z. The pressure relief portion 123 is provided centrally in the cover plate 121 and penetrates the cover plate 121 in the second direction Z, and the two electrode terminals 122 are respectively provided on two sides of the pressure relief portion 123 in the first direction X.

In other embodiments, depending on the shape of the battery cell 10, the cover plate 121 may also in another shape, such as a circular shape or an elliptical shape, and the electrode terminals 122 and the pressure relief portion 123 may also arranged in another manner.

As shown in FIGS. 3 and 4, the electrode assembly 13 is provided inside the housing 11, and the electrode assembly 13 comprises a main body 131 and two tabs 132 with opposite polarity, wherein each tab 132 extends from an end of the main body 131 in the first direction X. The main body 131 comprises a positive electrode plate, a negative electrode plate, and a separator, wherein the separator is located between the positive electrode plate and the negative electrode plate for separating the positive electrode plate from the negative electrode plate. One of the two tabs 132 is a positive tab, and the other is a negative tab. The positive electrode terminal 122 is electrically connected to the positive tab of the electrode assembly 13 by means of one current collecting member 14, and the negative electrode terminal 122 is electrically connected to the negative tab of the electrode assembly 13 by means of the other current collecting member 14.

In some embodiments of the present application, the electrode assembly 13 may be of a wound structure with a winding axis parallel to the first direction X.

In other embodiments, the electrode assembly 13 may also be of a laminated structure that is stacked in the third direction Y.

In some embodiments of the present application, a thickness direction of the tab 132 is parallel to the third direction Y.

In other embodiments, the thickness direction of the tab 132 may also be provided in other directions. For example, the thickness direction of the tab 132 is parallel to the first direction X.

The insulating member 15 comprises a terminal protrusion connected to the electrode lead-out hole and a positioning protrusion connected to the current collecting member 14. The terminal protrusion is inserted into the electrode lead-out hole, and the electrode terminal 122 passes through the terminal protrusion in the Z direction in insulating manner, and is connected to the busbar component outside the battery cell 10 and to the current collecting member 14 inside the battery cell 10. The insulating member 15 also insulates the cover plate 121 from the current collecting member 14 in the Z direction, so as to avoid conductive connection between the electrode assembly 13 and the cover plate 121.

As shown in FIGS. 3 and 4, the two tabs 132 are oppositely provided at two ends of the main body 131 of the electrode assembly 13 in the first direction X, and each tab 132 is connected to the electrode terminal 122 of the same polarity by means of one current collecting member 14.

The specific configuration of the current collecting member 14 and the manner in which the current collecting member is connected to the tab 132 and the electrode terminal 122 will be specifically described below by taking one group of the tab 132, the electrode assembly 13, and the current collecting member 14 as an example.

As shown in FIGS. 3 and 4, the current collecting member 14 comprises a terminal connecting portion 141 and a tab connecting portion 142 that are separately provided and connected to each other. At least part of the tab connecting portion 142 is provided between the main body 131 and the housing 11 in the first direction X, and at least part of the terminal connecting portion 141 is provided between the main body 131 and the cover plate 121 in the second direction Z. The tab connecting portion 142 is used to connect the tab 132 and the terminal connecting portion 141, and the tab connecting portion 142 is configured such that: the tab connecting portion 142 has a rigidity less than the rigidity of the terminal connecting portion 141 to allow a relative movement between the cover plate 121 and the electrode assembly 13 by means of deformation of the tab connecting portion 142.

In the above-described solution, since the tab connecting portion 142 of the current collecting member 14 has a rigidity less than the rigidity of the terminal connecting portion 141, the tab connecting portion 142 can be deformed, when the electrode assembly 13 is placed into the housing 11, to allow the relative movement between the cover plate 121 and the electrode assembly 13, so that the cover plate edge 1211 circumferentially abuts against the opening edge 111 of the housing 11, thereby closing the opening of the housing 11 by means of the cover plate 121. Due to the characteristics of the current collecting member 14, assembling the current collecting member in the battery cell 10 can reduce the adverse effect caused by an assembly error, and can improve the assembly precision between the cover plate 121 and the housing 11, so that the battery cell 10 has high energy density, safety performance, and appearance quality.

In some embodiments of the present application, the "rigidity" of the terminal connecting portion 141 and the tab connecting portion 142 may be understood as a force required for a unit displacement of a component, or the amount of displacement of the assembly when a unit acting force is applied to a component. Since the tab connecting portion 142 has a rigidity less than the rigidity of the terminal connecting portion 141, the degree of deformation of the tab connecting portion 142 is greater than the degree of deformation of the terminal connecting portion 141 under the same acting force.

In some embodiments of the present application, the sentence "the terminal connecting portion 141 and the tab connecting portion 142 are separately provided and connected to each other" may be understood as that the terminal connecting portion 141 and the tab connecting portion 142 that are separately provided are connected to each other by welding; it can also be understood that the terminal connecting portion 141 and the tab connecting portion 142 that are separately provided are connected to each other by means of a connector, and the connector may be a threaded part, or a rivet, etc.; and it can also be understood that the terminal connecting portion 141 and the tab connecting portion 142 that separately provided are bonded to each other by using a conductive adhesive.

In the above-described solution, the tab connecting portion 142 and the tab 132 may cooperate with each other in various implementations; the terminal connecting portion 141 and the tab 132 may be arranged on the same side of the tab connecting portion 142, or on two sides of the tab connecting portion 142; and the implementation in which the tab connecting portion 142 has a rigidity less than the rigidity of the terminal connecting portion 141 may be such that the tab connecting portion 142 is of a multilayer structure, may be such that the tab connecting portion 142 has a cross-sectional area less than the cross-sectional area of the terminal connecting portion 141, or may also be such that the tab connecting portion 142 has a hardness less than the hardness of the terminal connecting portion 141, etc. The detailed implementation will be further set forth below.

Figure 5:
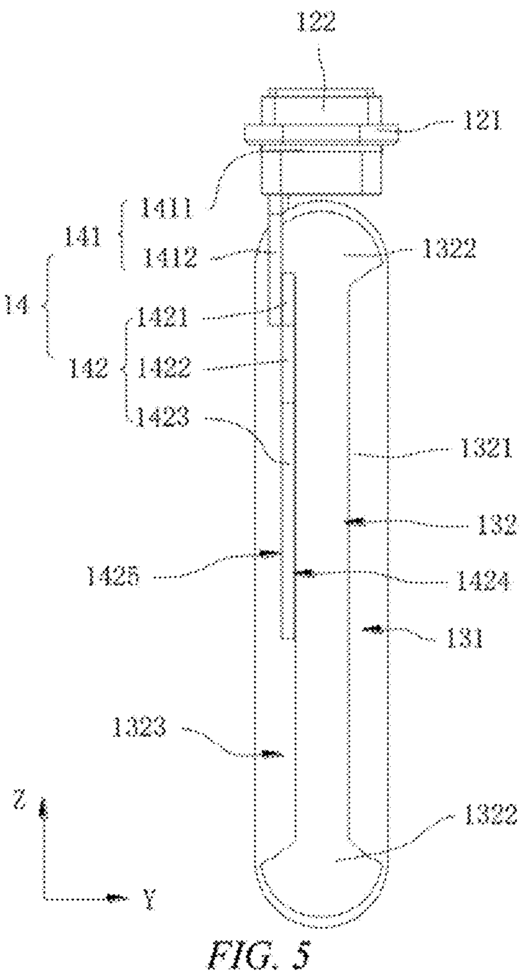
FIG. 5 shows a side schematic structural diagram of a combination formed by assembling an electrode assembly, a cover plate, and a current collecting member of a battery cell in some embodiments of the present application.
Figure 6:
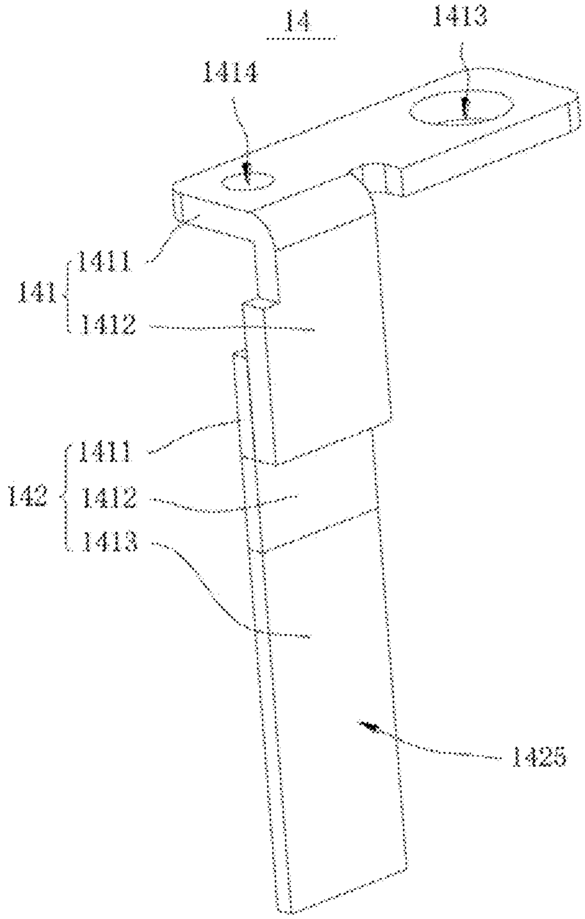
FIG. 6 shows an isometric diagram of a current collecting member in some embodiments of the present application.

FIG. 5 shows a side schematic structural diagram of a combination formed by assembling an electrode assembly, a cover plate, and a current collecting member of the battery cell 10 in some embodiments of the present application; and FIG. 6 shows an isometric diagram of a current collecting member in some embodiments of the present application.

As shown in FIGS. 4 and 5, the terminal connecting portion 141 comprises a first portion 1411 and a second portion 1412. The first portion 1411 is provided between the cover plate 121 and the main body 131, and the first portion 1411 is used for connection to the electrode terminal 122. The first portion 1411 extends in the first direction X, with a thickness direction thereof being parallel to the second direction Z. The second portion 1412 extends in the second direction Z and is provided between the main body 131 and the housing 11 (see FIG. 3) in the first direction X, with one end of the second portion 1412 in the second direction Z being connected to the first portion 1411.

In the above-described structural form, the terminal connecting portion 141 is connected to the electrode terminal 122 by means of the first portion 1411, and is connected to the tab connecting portion 142 by means of the second portion 1412. During assembly, it is possible to achieve that the first portion 1411 is first connected to the electrode terminal 122, the tab connecting portion 142 is connected to the tab 132 of the electrode assembly 13, and the cover plate 121 assembled with the terminal connecting portion 141, and the electrode assembly 13 assembled with the tab connecting portion 142 that are separately provided are then connected by means of the second portion 1412 and the tab connecting portion 142 so as to form a combination, which not only facilitates the assembly, but also improves the assembly efficiency.

In the above-described solution, the first portion 1411 may be entirely provided between the cover plate 121 and the main body 131, or partially provided between the cover plate 121 and the main body 131.

In some embodiments of the present application, the first portion 1411 is entirely provided between the cover plate 121 and the main body 131, and the second portion 1412 extending in the second direction Z and the first portion 1411 are connected between the cover plate 121 and the main body 131. With this structural form, it is possible to simplify the structure of the current collecting member 14 and thus reduce the manufacturing cost.

In other embodiments, part of the first portion 1411 is provided between the cover plate 121 and the main body 131, the remaining part is provided between the cover plate 121 and the tab 132, and the second portion 1412 extending in the second direction Z and the first portion 1411 are connected between the cover plate 121 and the tab 132. With this structural form, the terminal connecting portion 141 and the tab connecting portion 142 are connected to each other by using a gap between the tab 132 and the housing 11, so that the possibility of deflection of the electrode assembly 13 due to the current collecting member 14 pressing against the electrode assembly 13 can be reduced.

As shown in FIGS. 5 and 6, the terminal connecting portion 141 is provided with a terminal via hole 1413 and a positioning hole 1414 in a thickness direction thereof. The terminal via hole 1413 is used for the electrode terminal 122 to pass through, and two ends of the electrode terminal 122 are riveted in the second direction Z to fixedly connect the cover plate 121 to the first portion 1411. The positioning hole 1414 is used to cooperate with the positioning protrusion of the insulating member 15 so as to position the first portion 1411 relative to the insulating member 15.

As shown in FIGS. 5 and 6, the tab connecting portion 142 extends in the second direction Z and is provided between the main body 131 and the housing 11 (see FIG. 3) in the first direction X, and the tab connecting portion 142 comprises a first segment 1421, a second segment 1422, and a third segment 1423 that are provided in the second direction Z. The first segment 1421 is used for connection to the other end of the second portion 1412 in the second direction Z, the third segment 1423 is used for connection to the tab 132, and the second segment 1422 is connected to the first segment 1421 and the third segment 1423.

It should be understood that the sentence "the second portion 1412 extends in the second direction Z" means that a lengthwise direction of the second portion 1412 is substantially parallel to the second direction Z. For example, the second portion 1412 may extend along a straight line parallel to the second direction Z; and for another example, the second portion 1412 may also extend along an arc or curve that extends substantially in the second direction Z. A thickness direction and a width direction of the second portion 1412 extend substantially in directions perpendicular to the second direction Z. For example, the thickness direction of the second portion 1412 extends in the third direction Y, and the width direction thereof extends in the first direction X; for another example, the thickness direction and the width direction of the second portion 1412 vary in portions extending in the second direction Z; and for a further example, the thickness direction and the width direction of the second portion 1412 extend in other directions provided inclined relative to the second direction Z, which will not be specifically limited, etc.

When there is a positional deviation between the cover plate 121 and the housing 11 after the electrode assembly 13 is placed inside the housing 11, the tab connecting portion 142 allows the relative movement between the cover plate 121 and the electrode assembly 13 by means of deformation of the second segment 1422, so that the cover plate edge 1211 circumferentially abuts against the opening edge 111 of the housing 11, thereby closing the opening of the housing 11 by means of the cover plate 121.

It should be understood that the cover plate 121 may move relative to the electrode assembly 13 in a single direction, or move relative to the electrode assembly 13 in multiple directions, depending on the positional deviation between the cover plate 121 and the housing 11. Correspondingly, the second segment 1422 may also be deformed in a single direction or in multiple directions.

For example, when there is a positional deviation between the cover plate edge 1211 of the cover plate 121 and the opening edge 111 of the housing 11 in the second direction Z, the second segment 1422 is deformed in the second direction Z; and when there is a positional deviation between the cover plate edge 1211 of the cover plate 121 and the opening edge 111 of the housing 11 in the third direction Y, the second segment 1422 is deformed in the third direction Y.

As another example, when there is a positional deviation between the cover plate edge 1211 of the cover plate 121 and the opening edge 111 of the housing 11 in both the second direction Z and the third direction Y, the second segment 1422 is deformed in both the second direction Z and the third direction Y.

In the above-described solution, the thickness direction of the tab 132 is parallel to the third direction Y, and the thickness directions of the tab connecting portion 142 and the tab 132 may be the same or different.

As shown in FIGS. 5 and 6, in some embodiments of the present application, the thickness direction of the tab connecting portion 142 and the thickness direction of the tab 132 are the same and are both parallel to the third direction Y, so that there is a large connection area between the tab connecting portion 142 and the tab 132, the overcurrent capacity of the tab connecting portion 142 is improved, and the tab 132 and the tab connecting portion 142 can also be assembled in a compact manner as much as possible, improving the energy density of the battery cell 10.

In other embodiments, the thickness direction of the tab connecting portion 142 may also be different from the thickness direction of the tab 132. For example, the thickness direction of the tab 132 is parallel to the third direction Y, and the thickness direction of the tab connecting portion 142 is parallel to the first direction X.

Based on the above-described structural form, the thickness directions of the first segment 1421 of the tab connecting portion 142 and the second portion 1412 of the terminal connecting portion 141 may be the same or different.

In some embodiments of the present application, the thickness direction of the second portion 1412 of the terminal connecting portion 141 is parallel to the third direction Y, and the second portion 1412 is overlapped with and connected to the first segment 1421 in the third direction Y.

In the above-described structural form, the thickness directions of the second portion 1412, the tab connecting portion 142 and the tab 132 all extend in the third direction Y, and the second portion 1412 is overlapped with the first segment 1421 in the third direction, so that there are large connection areas between the tab connecting portion 142 and the tab 132, and between the tab connecting portion 142 and the second portion 1412, and the current collecting member 14 thus has a good overcurrent capacity.

In another embodiments of the present application, the thickness directions of the second portion 1412 and the first segment 1421 are both parallel to the third direction Y, and the second portion 1412 and the first segment 1421 are connected to each other by means of two mutually close ends in the second direction Z without an overlapping area in the third direction Y.

In another embodiments of the present application, the thickness directions of the second portion 1412 and the first segment 1421 may be different. For example, the second portion 1412 and the first segment 1421 are connected to each other by means of two opposing side surfaces in the first direction X without an overlapping area in the third direction Y.

In the above-described solution, the terminal connecting portion 141 and the tab 132 may be arranged on the same side of the tab connecting portion 142, or on the two sides of the tab connecting portion 142.

As shown in FIGS. 5 and 6, two sides of the tab connecting portion 142 in the thickness direction thereof (i.e., the third direction Y) are respectively a first surface 1424 and a second surface 1425, wherein the first surface 1424 is a surface close to the tab 132 in the third direction Y, and the second surface 1425 is a surface away from the tab 132 in the third direction Y.

In some embodiments of the present application, the second portion 1412 is located on the side of the tab connecting portion 142 away from the tab 132, namely, the second portion 1412 is attached to the second surface 1425 so as to achieve connection between the terminal connecting portion 141 and the tab connecting portion 142. The first surface 1424 is attached and welded to a tab main body 1321.

In the above-described structural form, it is possible not only to prevent short circuit inside the battery cell 10 due to the second portion 1412 being inserted into the tab 132, but also to make full use of the surfaces of the tab connecting portion 142 on the opposite sides in the third direction Y, thereby increasing the connection areas between the tab 132 and the tab connecting portion 142 and between the second portion 1412 and the tab connecting portion, and improving the overcurrent capacity of the current collecting member 14.

In other embodiments, both the second portion 1412 and the tab 132 may also be attached to the first surface 1424 of the tab connecting portion 142.

In the above-described solution, the tab connecting portion 142 may protrude from the electrode assembly 13 in the third direction Y, or the tab connecting portion 142 may be accommodated in a leftover space between the theoretical maximum cuboid space of the electrode assembly 13 and an actually occupied space thereof, so that the electrode assembly 13 and the current collecting member 14 can be assembled compactly, the volume of the battery cell 10 can be reduced, and the energy density of the battery cell 10 can be improved.

Figure 7:
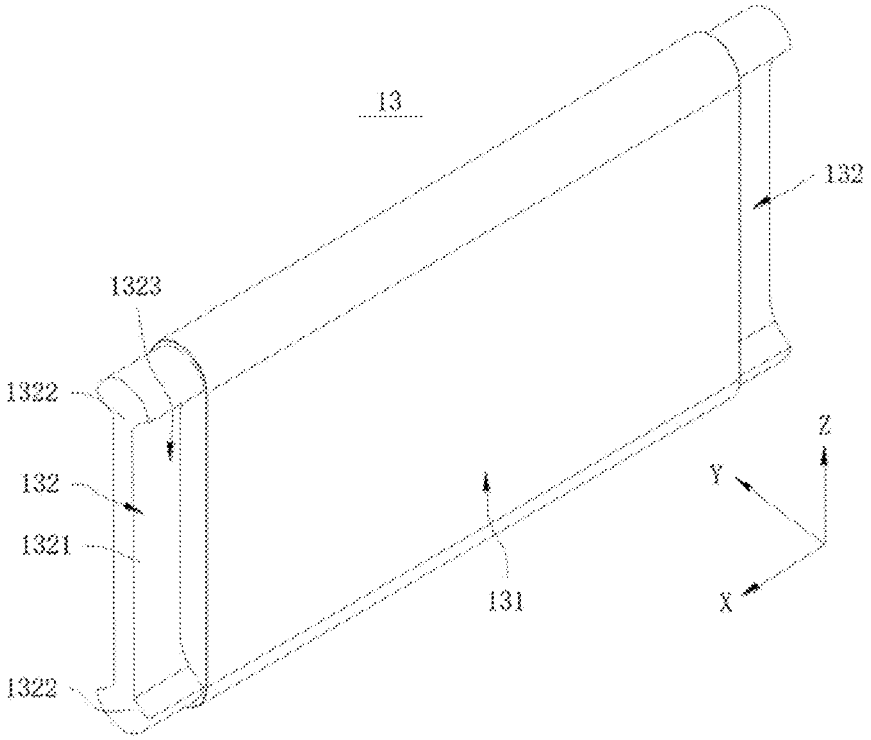
FIG. 7 shows a schematic structural diagram of an electrode assembly of a battery cell in some embodiments of the present application.

FIG. 7 shows a schematic structural diagram of an electrode assembly of a battery cell in some embodiments of the present application.

As shown in FIGS. 5, 6 and 7, in some embodiments of the present application, the tab 132 comprises a tab main body 1321 and two tab edge portions 1322, wherein the tab main body 1321 is provided between the two tab edge portions 1322, the two tab edge portions 1322 are spaced apart from each other in the second direction Z, each tab edge portion 1322 protrudes from the tab main body 1321 in the third direction Y, and the two tab edge portions 1322 and the tab main body 1321 jointly define an accommodating space 1323. At least part of the tab connecting portion 142 is located in the accommodating space 1323 and is connected to the tab main body 1321.

As shown in FIG. 5, in some embodiments of the present application, the tab connecting portion 142 is entirely located inside the accommodating space 1323, and is connected to the tab main body 1321 inside the accommodating space 1323.

In the above-described structural form, it is possible to effectively utilize the accommodating space 1323 of the tab 132 without increasing the maximum external dimension after the assembly of the electrode assembly 13 and the current collecting member 14 and thus the external dimension of the battery cell 10, and therefore, the battery cell 10 can have a compact structure and a high energy density.

In other embodiments, the third segment 1423 of the tab connecting portion 142 is connected to the tab main body 1321 inside the accommodating space 1323, and at least part of the first segment 1421 is located outside the accommodating space 1323 and connected to the first portion 1411 so as to prevent deflection of the tab 132 in the third direction Y due to the first segment 1421 of the tab connecting portion 142 pressing against the tab edge portion 1322.

In the above-described solution, there may be various implementations in which the tab connecting portion 142 has a rigidity less than the rigidity of the terminal connecting portion 141, which may be such that the tab connecting portion 142 is of a multilayer structure, may be such that the tab connecting portion 142 has a cross-sectional area less than the cross-sectional area of the terminal connecting portion 141, or may also be such that the tab connecting portion 142 has a hardness less than the hardness of the terminal connecting portion 141, etc.

Figure 8:
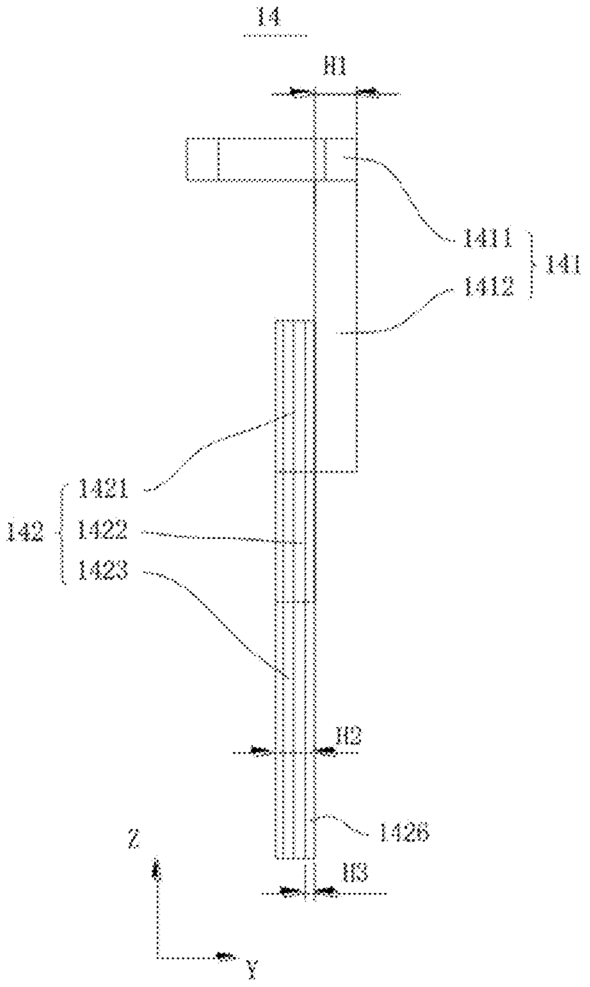
FIG. 8 shows a side schematic structural diagram of a current collecting member in another embodiments of the present application.

FIG. 8 shows a side schematic structural diagram of a current collecting member in a form in some embodiments of the present application.

As shown in FIG. 8, in some embodiments of the present application, the tab connecting portion 142 is of a multilayer structure and comprises a plurality of layers of conductive sheets 1426 provided in a stacked manner, and the terminal connecting portion 141 is of a single-layer structure.

The plurality of layers of conductive sheets 1426 are provided in a stacked manner in the third direction Y, so that the hardness of the tab connecting portion 142 can be remarkably reduced, and the tab connecting portion 142 can be flexibly deformed and less likely to break, and can also have a good overcurrent capacity.

In some embodiments of the present application, the conductive sheets 1426 and the terminal connecting portion 141 are made of the same material, such as aluminum, foil, etc.

In other embodiments, the material of the conductive sheets 1426 and the terminal connecting portion 141 may also be flexibly selected according to the rigidity requirements and the overcurrent capacity requirements of the tab connecting portion 142 and the terminal connecting portion 141, and the materials of the conductive sheets 1426 and the terminal connecting portion 141 may also be different.

In some embodiments of the present application, each layer of conductive sheet 1426 of the plurality of layers of conductive sheet 1426 has the same thickness H3, so that current uniformly flows through the tab connecting portion 142, and each layer of conductive sheet 1426 has the same rigidity, so that the single layer of conductive sheet 1426 is less likely to break when the tab connecting portion 142 is deformed.

In other embodiments, the thickness of each layer of conductive sheet 1426 may also not be limited.

In the above-described solution, two adjacent layers of conductive sheets 1426 are connected to each other to improve the overcurrent capacity of the tab connecting portion 142.

In some embodiments of the present application, two adjacent layers of conductive sheets 1426 are connected to each other by welding or by means of a conductive adhesive, so that the two adjacent layers of conductive sheets 1426 can be connected to each other to improve the overcurrent capacity of the tab connecting portion.

In other embodiments, two adjacent layers of conductive sheets 1426 may also be connected to each other in other forms. For example, the multilayer structure is formed by folding a large conductive sheet multiple times, two adjacent layers of conductive sheets 1426 are connected to each other on one side edge in the first direction X, and are connected, on the other side edge, to two other adjacent two layers of conductive sheets 1426, respectively. For another example, the multilayer structure is formed by winding a large conductive sheet around an axis extending in the second direction Z.

In some embodiments of the present application, the tab connecting portion 142 has a hardness less than the hardness of the terminal connecting portion 141 to achieve that the tab connecting portion 142 has a rigidity less than the rigidity of the terminal connecting portion 141.

For example, the surface of the tab connecting portion 142 may be embossed in the thickness direction (i.e., the third direction Y) of the tab connecting portion 142 so as to reduce the hardness thereof. For another example, the material of the tab connecting portion 142 has a hardness less than the hardness of the material of the terminal connecting portion 141.

In some embodiments of the present application, the tab connecting portion 142 has a thickness H2 and the terminal connecting portion 141 has a thickness H1 (H2<H1), so as to achieve that the tab connecting portion 142 has a rigidity less than the rigidity of the terminal connecting portion 141.

In another embodiments of the present application, the tab connecting portion 142 has a width less than the width of the terminal connecting portion 141, so as to achieve that the tab connecting portion 142 has a rigidity less than the rigidity of the terminal connecting portion 141.

Some embodiments of the present application provide a method for manufacturing a battery cell 10, comprising:

providing a housing 11, the housing 11 being provided with an opening;

providing an end cap assembly 12, the end cap assembly 12 comprising a cover plate 121 and an electrode terminal 122, the cover plate 121 being used to cover the opening, and the electrode terminal 122 being provided on the cover plate 121;

providing an electrode assembly 13, the electrode assembly 13 comprising a main body 131 and a tab 132 extending from an end of the main body 131 in a first direction X, the end cap assembly 12 being located on one side of the main body 131 in a second direction Z, and the first direction X being perpendicular to the second direction Z;

providing a current collecting member 14, the current collecting member 14 comprising a terminal connecting portion 141 and a tab connecting portion 142 that are separately provided and connected to each other, at least part of the tab connecting portion 142 being provided between the main body 131 and the housing 11 in the first direction X, at least part of the terminal connecting portion 141 being provided between the main body 131 and the cover plate 121 in the second direction Z, the tab connecting portion 142 being used to connect the tab 132 and the terminal connecting portion 141, and the tab connecting portion 142 being configured such that: the tab connecting portion 142 has a rigidity less than the rigidity of the terminal connecting portion 141 to allow a relative movement between the cover plate 121 and the electrode assembly 13 by means of deformation of the tab connecting portion 142; and connecting the tab 132 and the electrode terminal 122 by means of current collecting member 14, placing the electrode assembly 13 inside the housing 11, and then closing the opening with the cover plate 121.

Some embodiments of the present application provide an apparatus for manufacturing a battery cell 10, comprising:

a first provision device for providing a housing 11, the housing 11 being provided with an opening;

a second provision device for providing an end cap assembly 12, the end cap assembly 12 comprising a cover plate 121 and an electrode terminal 122, the cover plate 121 being used to cover the opening, and the electrode terminal 122 being provided on the cover plate 121;

a third provision device for providing an electrode assembly 13, the electrode assembly 13 comprising a main body 131 and a tab 132 extending from an end of the main body 131 in a first direction X, the end cap assembly 12 being located on one side of the main body 131 in a second direction Z, and the first direction X being perpendicular to the second direction Z;

a fourth provision device for providing a current collecting member 14, the current collecting member 14 comprising a terminal connecting portion 141 and a tab connecting portion 142 that are separately provided and connected to each other, at least part of the tab connecting portion 142 being provided between the main body 131 and the housing 11 in the first direction X, at least part of the terminal connecting portion 141 being provided between the main body 131 and the cover plate 121 in the second direction Z, the tab connecting portion 142 being used to connect the tab 132 and the terminal connecting portion 141, and the tab connecting portion 142 being configured such that: the tab connecting portion 142 has a rigidity less than the rigidity of the terminal connecting portion 141 to allow a relative movement between the cover plate 121 and the electrode assembly 13 by means of deformation of the tab connecting portion 142; and a mounting module for connecting the tab 132 and the electrode terminal 122 by means of the current collecting member 14, placing the electrode assembly 13 inside the housing 11, and then closing the opening with the cover plate 121.

It should be noted that the implementation order of the steps of the welding method described above is not specifically limited, and the implementation order of the steps of the welding method described above is also not the only implementation order.

It should be noted that, in the case of no conflict, the features in the embodiments of the present application can be combined with each other.

The foregoing descriptions are merely preferred embodiments of the present application, but are not intended to limit the present application. For those skilled in the art, the present application may have various modifications and variations. Any modifications, equivalent substitutions, improvements, and the like made within the spirit and principle of the present application should be included within the scope of protection of the present application.

The invention claimed is:

1. A battery cell, comprising:

a housing provided with an opening;

an end cap assembly comprising a cover plate and an electrode terminal, the cover plate being used to cover the opening, and the electrode terminal being provided on the cover plate;

an electrode assembly provided in the housing, the electrode assembly comprising a main body and a tab extending from an end of the main body in a first direction, the end cap assembly being located on one side of the main body in a second direction, and the first direction being perpendicular to the second direction; and a current collecting structure comprising a terminal connecting portion and a tab connecting portion that are separately provided and connected to each other, at least part of the tab connecting portion being provided between the main body and the housing in the first direction, at least part of the terminal connecting portion being provided between the main body and the cover plate in the second direction, the tab connecting portion being used to connect the tab and the terminal connecting portion, and the tab connecting portion being configured such that: the tab connecting portion has a rigidity less than a rigidity of the terminal connecting portion to allow a relative movement between the cover plate and the electrode assembly by means of deformation of the tab connecting portion, wherein the tab connecting portion extends in the second direction and is provided between the main body and the housing in the first direction, and the terminal connecting portion comprises a first portion that is provided between the cover plate and the main body and used for connection to the electrode terminal, and a second portion that extends in the second direction and is provided between the main body and the housing and used for connection to the tab connecting portion, the terminal connecting portion comprises a terminal via hole for the electrode terminal to pass through and a positioning hole for positioning the first portion relative to an insulating structure, and the tab connecting portion is of a multilayer structure and comprises a plurality of layers of conductive sheets provided in a stacked manner, and the terminal connecting portion is of a single-laver structure, wherein the tab connecting portion comprises a first segment, a second segment and a third segment that are provided in the second direction, the first segment being used for connection to the terminal connecting portion, the third segment being used for connection to the tab, the second segment being connected to the first segment and the third segment, and the tab connecting portion allowing the relative movement between the cover plate and the electrode assembly by means of deformation of the second segment.

2. The battery cell according to claim 1, wherein the second portion is overlapped with and connected to the tab connecting portion in a third direction, the third direction is perpendicular to the first direction and the second direction, and a thickness direction of the tab and a thickness direction of the tab connecting portion are both parallel to the third direction.

3. The battery cell according to claim 2, wherein the second portion is located on a side of the tab connecting portion away from the tab.

4. The battery cell according to claim 3, wherein the tab comprises two tab edge portions and a tab main body provided between the two tab edge portions, the two tab edge portions protruding from the tab main body in the third direction, the two tab edge portions and the tab main body jointly defining an accommodating space, and the tab connecting portion being at least partially located in the accommodating space and connected to the tab main body.

5. The battery cell according to claim 1, wherein thickness directions of the second portion, the tab connecting portion and, the tab all extend in the third direction, and the second portion is overlapped with the first segment in the third direction.

6. The battery cell according to claim 1, wherein thickness directions of the second portion and the first segment are both parallel to the third direction, and the second portion and the first segment are connected to each other by means of two mutually close ends in the second direction without an overlapping area in the third direction.

7. The battery cell according to claim 1, wherein the tab connecting portion has a thickness less than a thickness of the terminal connecting portion.

8. The battery cell according to claim 1, wherein the tab connecting portion has a hardness less than a hardness of the terminal connecting portion.

9. The battery cell according to claim 1, wherein the tab connecting portion has a cross-sectional area less than a cross-sectional area of the terminal connecting portion.

10. The battery cell according to claim 1, further comprising an insulating structure for insulating the cover plate from the current collecting structure.

11. The battery cell according to claim 1, wherein each layer of conductive sheet of the plurality of layers of conductive sheets has the same thickness.

12. The battery cell according to claim 1, wherein two adjacent layers of conductive sheets of the plurality of layers of conductive sheets are connected to each other by welding or by means of a conductive adhesive.

13. The battery cell according to claim 1, wherein the cover plate moves relative to the electrode assembly in multiple directions.

14. A battery, comprising the battery cell according to claim 1.

15. A power consuming device, comprising the battery according to claim 14.

16. A battery cell, comprising:

a housing provided with an opening;

an end cap assembly comprising a cover plate and an electrode terminal, the cover plate being used to cover the opening, and the electrode terminal being provided on the cover plate;

an electrode assembly provided in the housing, the electrode assembly comprising a main body and a tab extending from an end of the main body in a first direction, the end cap assembly being located on one side of the main body in a second direction, and the first direction being perpendicular to the second direction; and a current collecting structure comprising a terminal connecting portion and a tab connecting portion that are separately provided and connected to each other, at least part of the tab connecting portion being provided between the main body and the housing in the first direction, at least part of the terminal connecting portion being provided between the main body and the cover plate in the second direction, the tab connecting portion being used to connect the tab and the terminal connecting portion, and the tab connecting portion being configured such that: the tab connecting portion has a rigidity less than a rigidity of the terminal connecting portion to allow a relative movement between the cover plate and the electrode assembly by means of deformation of the tab connecting portion, wherein the tab connecting portion is of a multilayer structure and comprises a plurality of layers of conductive sheets provided in a stacked manner, and the terminal connecting portion is of a single-layer structure, wherein the tab connecting portion comprises a first segment, a second segment and a third segment that are provided in the second direction, the first segment being used for connection to the terminal connecting portion, the third segment being used for connection to the tab, the second segment being connected to the first segment and the third segment, and the tab connecting portion allowing the relative movement between the cover plate and the electrode assembly by means of deformation of the second segment.

17. The battery cell according to claim 16, wherein each layer of conductive sheet of the plurality of layers of conductive sheets has the same thickness.

18. A method for manufacturing a battery cell, comprising:

providing a housing, the housing being provided with an opening;

providing an end cap assembly, the end cap assembly comprising a cover plate and an electrode terminal, the cover plate being used to cover the opening, and the electrode terminal being provided on the cover plate;

providing an electrode assembly, the electrode assembly comprising a main body and a tab extending from an end of the main body in a first direction, the end cap assembly being located on one side of the main body in a second direction, and the first direction being perpendicular to the second direction;

providing a current collecting structure, the current collecting structure comprising a terminal connecting portion and a tab connecting portion that are separately provided and connected to each other, at least part of the tab connecting portion being provided between the main body and the housing in the first direction, at least part of the terminal connecting portion being provided between the main body and the cover plate in the second direction, the tab connecting portion being used to connect the tab and the terminal connecting portion, and the tab connecting portion being configured such that: the tab connecting portion has a rigidity less than a rigidity of the terminal connecting portion to allow a relative movement between the cover plate and the electrode assembly by means of deformation of the tab connecting portion; and connecting the tab and the electrode terminal by means of the current collecting structure, placing the electrode assembly inside the housing, and then closing the opening with the cover plate, wherein the tab connecting portion extends in the second direction and is provided between the main body and the housing in the first direction, and the terminal connecting portion comprises a first portion that is provided between the cover plate and the main body and used for connection to the electrode terminal, and a second portion that extends in the second direction and is provided between the main body and the housing and used for connection to the tab connecting portion, the terminal connecting portion comprises a terminal via hole for the electrode terminal to pass through and a positioning hole for positioning the first portion relative to an insulating structure, and the tab connecting portion is of a multilayer structure and comprises a plurality of layers of conductive sheets provided in a stacked manner, and the terminal connecting portion is of a single-layer structure, wherein the tab connecting portion comprises a first segment, a second segment and a third segment that are provided in the second direction, the first segment being used for connection to the terminal connecting portion, the third segment being used for connection to the tab, the second segment being connected to the first segment and the third segment, and the tab connecting portion allowing the relative movement between the cover plate and the electrode assembly by means of deformation of the second segment.

* * * * *